UNITED STATES PATENT OFFICE.

HANS RUPE, OF BASEL, SWITZERLAND, ASSIGNOR TO SOCIETY OF CHEMICAL INDUSTRY IN BASLE, OF BASEL, SWITZERLAND.

QUATERNARY BASE OF THE CAMPHOR SERIES AND PROCESS OF MAKING SAME.

1,399,082.

Specification of Letters Patent.

Patented Dec. 6, 1921.

No Drawing.

Application filed March 9, 1921. Serial No. 450,856.

*To all whom it may concern:*

Be it known that I, HANS RUPE, a citizen of the Swiss Republic, and resident of Basel, Switzerland, have invented new and useful Quaternary Bases of the Camphor Series and Processes of Making Same.

I have found, that quaternary bases of the camphor series are obtained by preparing the product of addition of a tertiary amin to camphylbrommethane in presence of a convenient solvent, according to the formula:

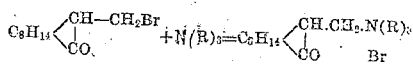

wherein R signifies an alkyl.

On the contrary, when camphylchlormethane is employed for instance with trimethylamin, the reaction occurs according to the formula:

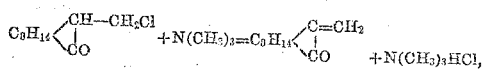

that is to say there is formed methylenecamphor and trimethylammonium chlorid.

This reaction occurs also as secondary reaction, when camphylbrommethane is employed, but the methylenecamphor formed can always be transformed into bromid and therefore be made again utilizable for the above reaction

Example.

A solution of 28 gr. of camphylbrommethane in 50 ccm. ether is heated with 30 gr. of an alcoholic solution of trimethlamin of 33 per cent. for 15 hours, under pressure, in a closed bottle on a boiling water-bath. After cooling, ether is added and the precipitated mixture of the quaternary base with the trimethylamin hydrobromid is separated by suction. After the ether has been distilled off, the methylenecamphor produced by the splitting off of HBr is recuperated and can immediately be restransformed into camphylbrommethane by its treatment with hydrobromic acid.

The mixture of trimethylamin hydrobromid with the quaternary ammonium base is treated with hot chloroform, wherein the said base is readily soluble, while the former is entirely insoluble therein. After filtration, the trimethylcamphormethyl-ammoniumbromid is precipitated from the filtrate by an addition of a little quantity of ether. It constitutes colorless, fine leaflets, easily soluble in alchol, in water and hot chloroform and containing, at ordinary temperature, still two molecules of trimethyl ammoniumbromid combined. When heated they melt at first at 192° C. while the above specified 2 molecules of trimethylammoniumbromid are separated, become again solid at a higher temperature and melt then with decomposition at 250° C.

What I claim is:

1. As new products, the herein described trialkylcamphormethylammonium haloids, which constitute colorless crystals, easily soluble in alcohol and in water.

2. As a new article of manufacture, the herein described trimethyl-camphormethyl-ammoniumbromid, which constitutes colorless, fine leaflets soluble in alcohol, water, and hot chloroform and containing at ordinary temperature two molecules of combined trimethylammoniumbromid, the said leaflets melting at 192° C. while the said two molecules of trimethylammoniumbromid are separated, become then again solid and melt finally at 250° C. with decomposition.

3. The herein described process for the manufacture of quaternary bases of the camphor series, consisting in adding a tertiary amin to camphylbrommethane in presence of a convenient solvent.

In witness whereof I have hereunto signed my name this ___ day of February, 1921, in the presence of two subscribing witnesses.

HANS RUPE.

Witnesses:
 FRIDA KURZ,
 AMAND RITTER.